Aug. 9, 1932.  W. VOORWINDE  1,870,538

AUTOMATIC GRIPPER

Filed Oct. 2, 1929  2 Sheets-Sheet 1

W. Voorwinde
INVENTOR

By Marks & Clerk
ATTYS.

Aug. 9, 1932.    W. VOORWINDE    1,870,538
AUTOMATIC GRIPPER
Filed Oct. 2, 1929    2 Sheets-Sheet 2
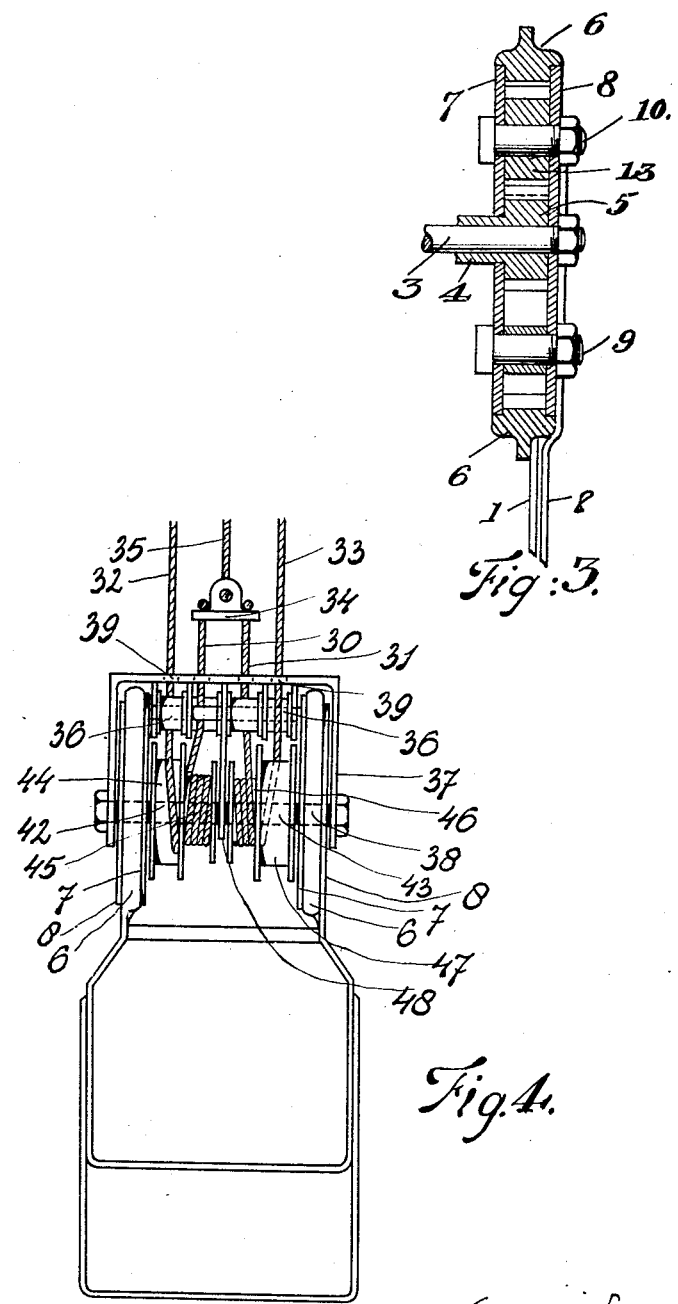

Patented Aug. 9, 1932 1,870,538

UNITED STATES PATENT OFFICE

WILLEM VOORWINDE, OF ROTTERDAM, NETHERLANDS

AUTOMATIC GRIPPER

Application filed October 2, 1929, Serial No. 396,916, and in the Netherlands October 2, 1928.

This invention relates to an automatic gripper, which consists of two halves and which exhibits this special feature, that for the opening and closing of the gripper use is made of gears.

For this purpose there are fitted to the halves of the gripper ring gears which are connected by means of a number of planet gears with a sun gear or gears which are connected with a drum or drums round which are coiled the cables for the opening and closing.

The drums are constructed with one part for the opening cable and one part for the closing or lifting cable.

When the gripper is in the closed position the opening cable is coiled upon its part of the drum. When the weight of the gripper is hanging from that cable and that cable is unwound, then the cable for the closing and lifting will be wound up.

By the rotating of the drum the gears are likewise set in motion, and the gripper is opened or closed by its own weight.

As soon as the ring gears, with the planet gears meshing therewith and the sun gears which are connected with the drums are all fitted into a closed casing, the great advantage is obtained that none the revolving parts, and the parts that transmit the various forces, come into contact with the material under treatment, and are therefore not subjected to contamination and considerable wear.

An important advantage of this gripper further consists in the fact that by increasing or decreasing the size of the toothed driving wheels or drums the gripping power can be varied according to the nature of the material under treatment.

The invention is illustrated in detail in the accompanying drawings, in which

Figure 1:
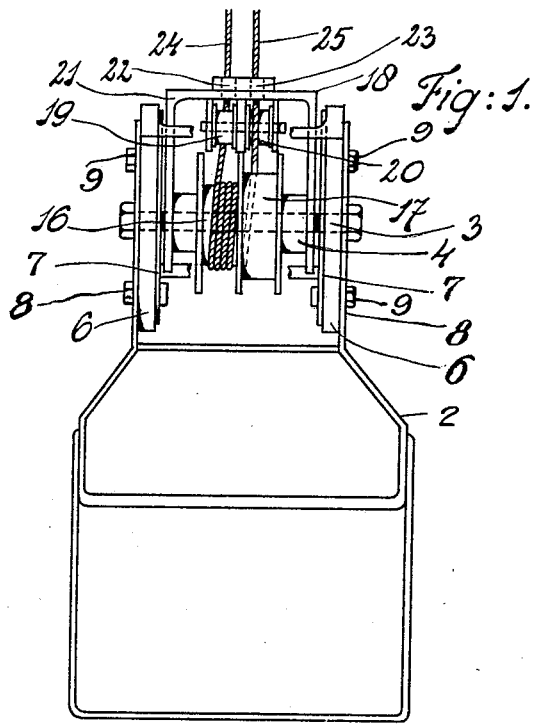
Figure 2:
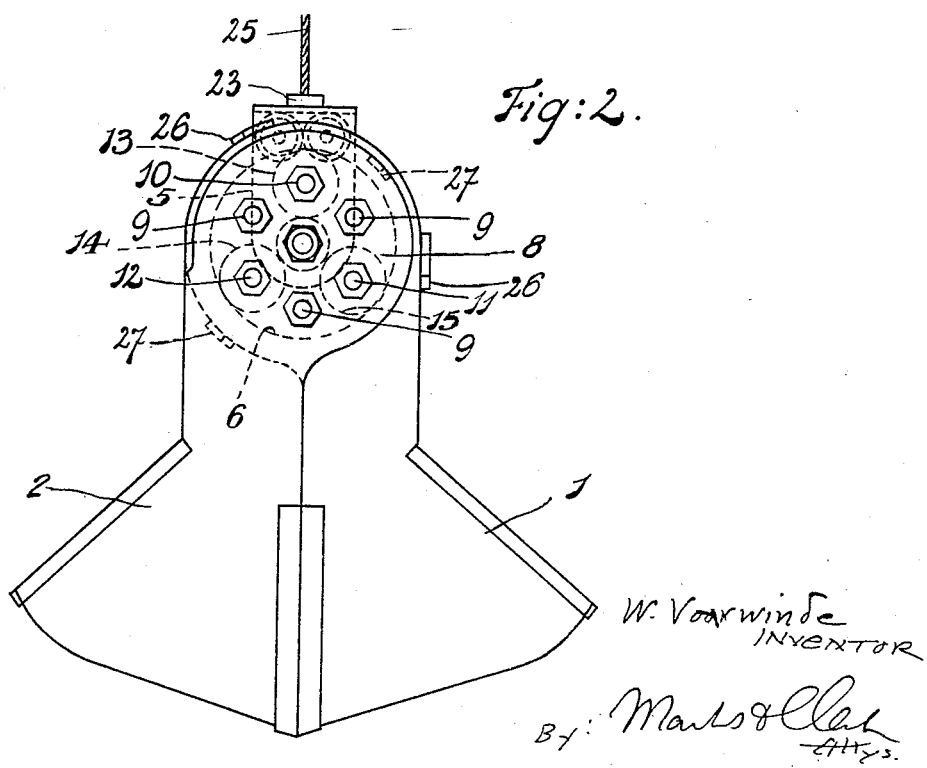

Figure 1 shows a view of the upper part of a gripper with a single cable for opening and a single cable for closing, Figure 2 shows the device according to Figure 1 in side elevation, Figure 3 is an upper part view of the gripper, from which the position of the gears will be evident, and Figure 4 shows a gripper for lifting apparatus, with two cables for closing and two cables for opening.

The gripper or grab consists of the two halves 1 and 2 which are adapted to be brought together and separated in the well known manner. The half indicated at 1 is connected at each side with a ring gear 6 forming part of a planetary gearing. The ring gear is rotatable about a plate 7 which latter is preferably let into a recess formed in the gear as shown in Fig. 3 and the plate is connected with a companion plate 8 at the opposite side of each ring gear 6 by bolts 9, and thus the two plates 7 and 8 together with the ring gear 6 present a closed casing to form a housing for the other gears which will be hereinafter more fully described.

Supporting shafts 10, 11 and 12 are suitably fixed through the plates 7 and 8 and rotatably support the planet wheels 13, 14 and 15 arranged at equal distances apart and in permanent mesh with the internal teeth of the ring gear 6.

The other half 2 of the gripper or grab is rigidly fixed in suitable manner to the plates 7 and 8 and pivotal connection between the two halves 1 and 2 is established by a spindle bolt 3 passing centrally through the plates 7 and 8 in concentric relation to the ring gear 6. A tubular shaft 4 surrounds the spindle bolt 3 and is provided at the ends thereof which terminate between the plates 7 and 8 with sun gear wheels 5, each sun gear 5 being in permanent mesh with one set of planetary gear wheels 13, 14 and 15 so that by the intermeshing of the various gear wheels the ring gear 6 is mounted for rotary movement about the spindle bolt 3 together with its half 1 of the gripper or grab.

The drum tube 4 carries two drums 16 and 17, which may be of unequal diameters.

Round the drum tube 4 is movably arranged a bent clip 18, in which are arranged two guiding rollers 19 and 20. Furthermore the medial portion 21 of the clip 18 is provided with two guiding apertures 22 and 23.

Round the drum 16 is coiled a cable 24 for the opening and round the drum 17 a cable 25 for the closing. The cable 24 has several turns round its drum and the cable 25 only extends a small part of the way round its drum.

The cables are so coiled that when one cable is running down the other is being wound up.

Now the apparatus works in the following manner:—

When the gripper is closed, the two cables 24 and 25 are in the position shown in Fig. 1, and the gripper is suspended by these two cables. Now if a pull is exerted on the cable 24, or, which is the same thing, the cable 25 is lowered, the set of drums 16 and 17, with the sun gears 5, is rotated by the weight of the gripper. The sun gears 5 rotate the planet gears 13, 14 and 15, which in their turn rotate the ring gears 6. Since the planet gears 13, 14 and 15, are connected by their shafts 10, 11 and 12 with the half 2 of the gripper, and the ring gear 6 is connected with the other half of the gripper, the two halves are caused to revolve in opposite directions, and the gripper opens.

Stop members 26 and 27 are secured to the respective parts 1 and 2 of the gripper and during the opening movement of said parts are brought into engagement with one another and thus limit the opening movement of the gripper.

The closing of the gripper is effected by the raising of the cable 25 which, during the opening has coiled several times round the drum 17.

The drum 17 may have a greater diameter than the drum 16, since for the gripping more force is usually required than for the opening.

In Figure 4 is illustrated a gripper for lifting appliances with two cables for opening and two cables for closing and raising.

The cables for opening are marked 30 and 31 and those for closing are marked 32 and 33.

When using a single cable 35 for the opening, a yoke 34 is provided, whereby the cable 35 is divided into two cables 30 and 31, which then pass in the gripper. For the guiding of the four cables 30, 31, 32, 33, four rollers 36 are provided, which are rotatably arranged in a bent clip 37, which is rotatable about the shaft 38 of the gripper, this clip being provided with four guiding apertures 39 for the entrance of the cable.

As contrasted with the two-cable gripper described, there are here provided on each half of the gripper on one side of the ring gear 6 and on the other side the plate 8 with the planet gears 13, 14 and 15. Round the shaft 38, which connects the gripper halves with one another, and is now to be rotatably located on one side in the plate 7, two drum tubes 42 and 43 are rotatable, upon which are arranged sets of drums 44, 45 and 46, 47, which sets are similar, but in which the drums 44, 45 and 46, 47 may be of different diameters. The sets of drums may be separated from one another by a side arm 48 of the clip 47.

The cables are coiled round the drum in such as a way that one set always revolves in the opposite direction to the other.

The action of this gripper construction agrees with that previously described with a single cable for the opening and a single cable for the closing and lifting (Fig. 1).

In the case of this gripper (Fig. 4) the opening is effected by holding fast the centre cables 30 and 31 or the cable 35, and subsequently letting the two outermost cables 32 and 33 run down. The weight of the gripper then lets the sets of drums rotate owing to the cables 30 and 31, whereby the cables 32 and 33 are again coiled on to their drums 44 and 47. By the movement of the drums, the drum tubes 42 and 43 and the sun gears arranged thereon are rotated, which in their turn rotate the planet gears and the ring gears, whereby the gripper halves, which are of equal weight, rotate about their common fulcrum, the shaft 38 into the open position, whereupon the same, by means of abutment cams or by the total length of the centre cables 30 and 31, being unwound, are held back.

The gripping or closing of the gripper halves is effected by raising the outer cables 32 and 33, which are coiled upon one part of the drums 44 and 47.

Owing to the fact that the clip 37 is rotatable with the rollers 36 about the shaft 38, in the event of a difference in the lengths of the working cables the clip will adjust itself and the cables will thereby be uniformly loaded.

Since the clip, in the case of a two-cable clip, always tends to adjust itself towards that side of the gripper where the cable which is subjected to the greater tension is leaving the drum, devices may be provided for the purpose of gripping the said clip always in the centre.

What I claim is:

1. In combination, a pair of grab members mounted for relative swinging movement, a ring gear connected with one grab member and arranged concentric to the axis of swinging movement of the members, a set of planetary gears connected with the other grab member and in mesh with the ring gear, and a sun gear mounted concentrically within the ring gear and in mesh with the planetary gears.

2. In combination, a pair of grab members mounted for relative swinging movement, a ring gear connected with one grab member at each side thereof and arranged concentric to the axis of swinging movement of the members, a set of planetary gears connected with the other grab member at each side thereof and in mesh with the ring gears, a sun gear mounted concentrically within each of the ring gears and in mesh with the planetary gears and a tubular shaft connecting the sun gears.

3. In combination, a pair of grab members mounted for relative swinging movement, a ring gear connected with one grab member at each side thereof and arranged concentric to the axis of swinging movement of the members, a set of planetary gears connected with the other grab member at each side thereof and in mesh with the ring gears, a sun gear mounted concentrically within the ring gears and in mesh with the planetary gears, a tubular shaft connecting the sun gears, and drums carried by the tubular shaft.

In testimony whereof I have signed my name to this specification.

WILLEM VOORWINDE.